United States Patent [19]

Takano et al.

[11] 4,356,522

[45] Oct. 26, 1982

[54] HEAD POSITIONING SIGNAL GENERATING APPARATUS

[75] Inventors: Masayuki Takano, Hon; Sadao Hosoi, Ebina, both of Japan

[73] Assignee: Sony Corporation, Tokyo, Japan

[21] Appl. No.: 201,051

[22] Filed: Oct. 27, 1980

[30] Foreign Application Priority Data

Oct. 29, 1979 [JP] Japan .................................. 54-139666

[51] Int. Cl.$^3$ ...................... G11B 21/10; G11B 21/18; G11B 5/52
[52] U.S. Cl. ........................................ 360/77; 360/70; 360/73; 360/109
[58] Field of Search ..................... 360/77, 70, 73, 107, 360/109, 66, DIG. 1; 310/330-332, 311

[56] References Cited

U.S. PATENT DOCUMENTS

| | | | |
|---|---|---|---|
| 4,151,569 | 4/1979 | Hathaway | 360/77 |
| 4,151,570 | 4/1979 | Ravizza et al. | 360/77 |
| 4,165,523 | 8/1979 | Hathaway | 360/DIG. 1 |
| 4,172,265 | 10/1979 | Sakamoto et al. | 360/77 |
| 4,223,358 | 9/1980 | Kubota | 360/DIG. 1 |
| 4,285,017 | 8/1981 | Arter et al. | 360/77 |

Primary Examiner—Alfred H. Eddleman
Attorney, Agent, or Firm—Lewis H. Eslinger; Alvin Sinderbrand

[57] ABSTRACT

A helical scan type video tape recorder adapted to perform in any one of a plurality of special reproducing modes, includes first and second rotary magnetic heads for reproducing a video signal from parallel tracks on a magnetic tape; first and second electrically deflectable, bi-morph leaves for supporting the first and second rotary magnetic heads; a control signal generator supplying a bias potential to the bi-morph leaves in accordance with the speed of movement of the tape so that the heads accurately scan the tracks; a hysteresis erase signal generator supplying a bias potential to the bi-morph leaves after the respective heads have completed scanning each track for removing hysteresis distortion from the respective bi-morph leaves; and a predictive potential generator for supplying a bias potential to the bi-morph leaves after the hysteresis distortion has been removed so that the magnetic heads accurately scan the beginning of the tracks, including an UP-DOWN counter for producing an output as a function of the speed of movement of the magnetic tape, the position of the heads relative to the tracks, and the rotation of the heads, and first and second sample-hold circuits for sampling the output of the counter at the end of the scan of a respective track by the first and second magnetic heads, respectively, and supplying the respective sampled outputs to the first and second bi-morph leaves, respectively, when the first and second heads begin scanning the next respective tracks.

12 Claims, 36 Drawing Figures

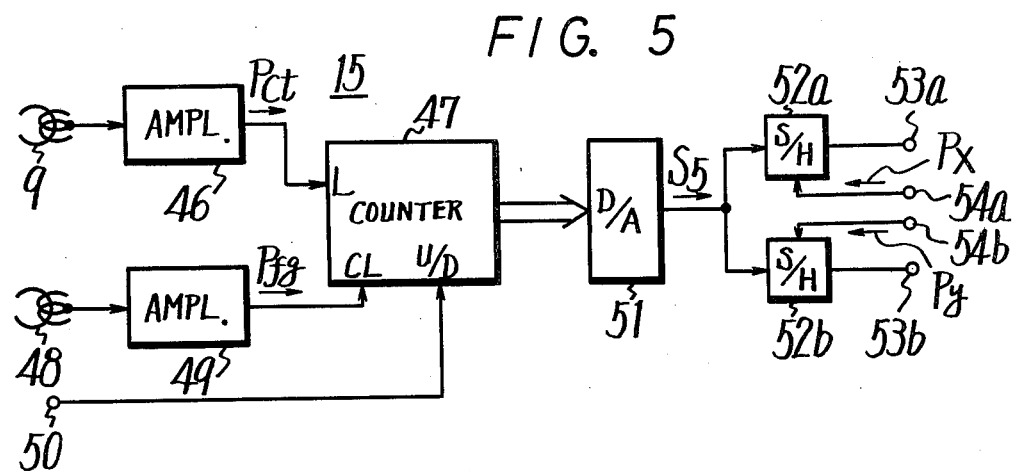
FIG. 5
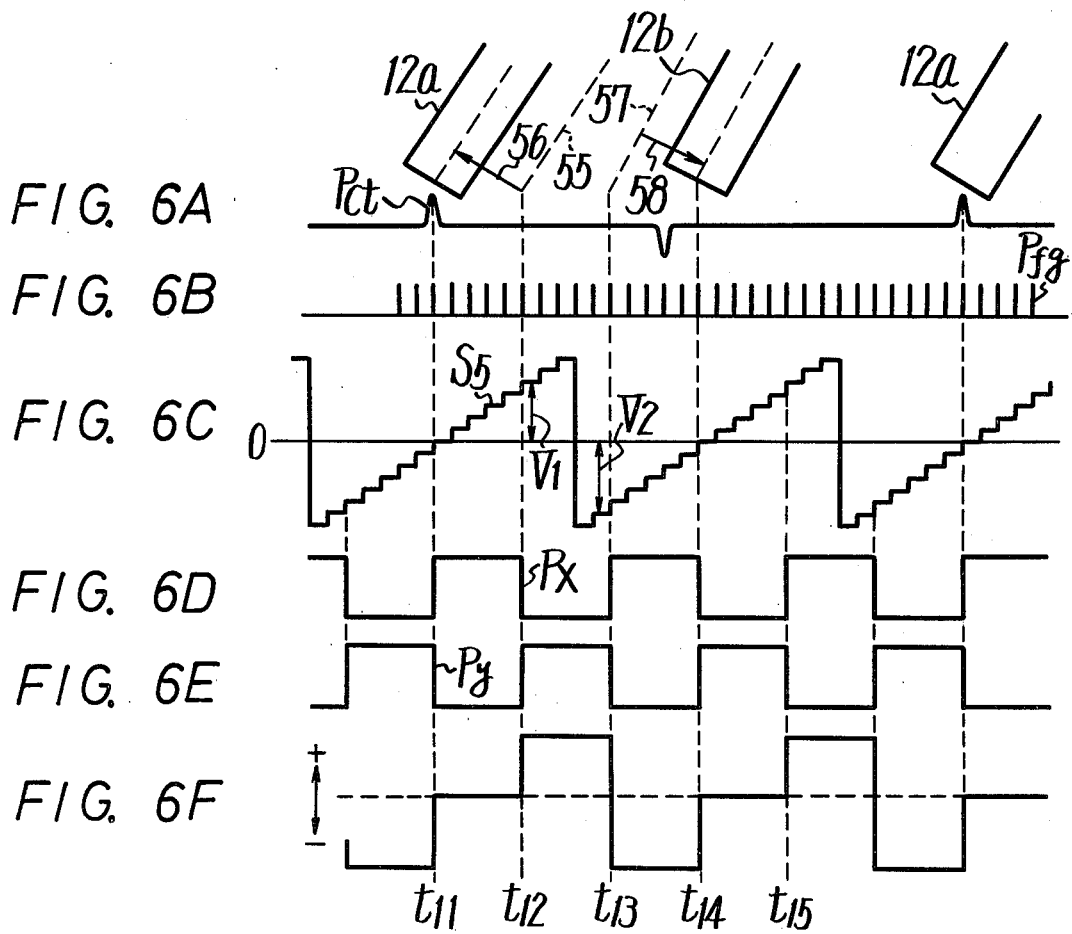
FIG. 6A
FIG. 6B
FIG. 6C
FIG. 6D
FIG. 6E
FIG. 6F

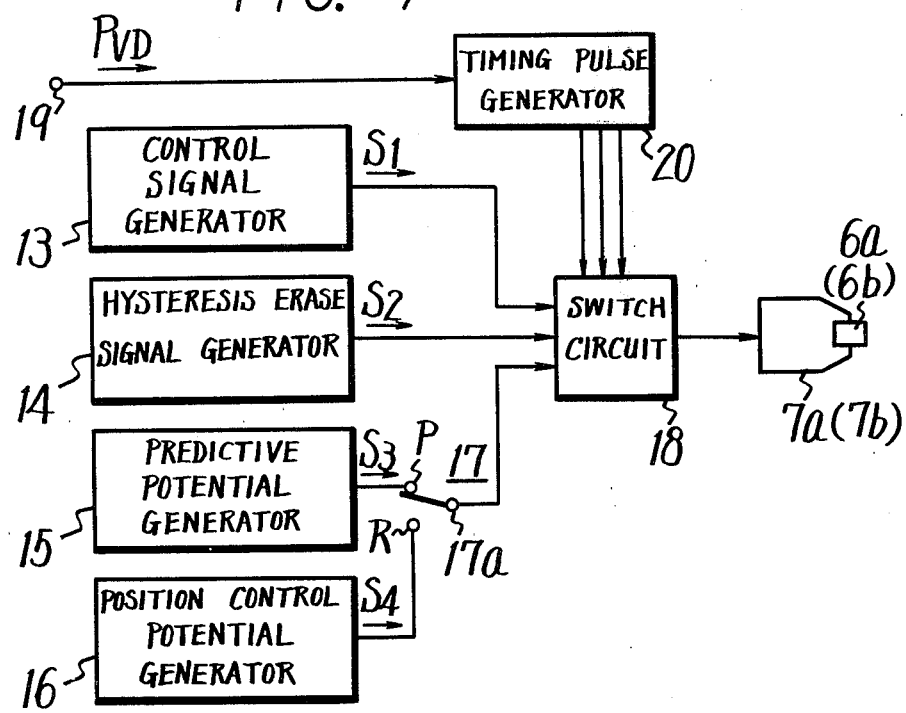
FIG. 7
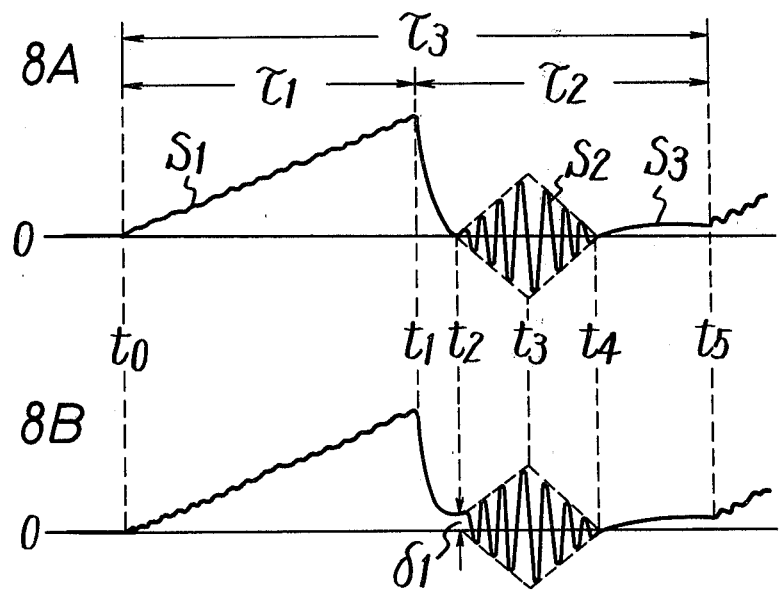
FIG. 8A
FIG. 8B

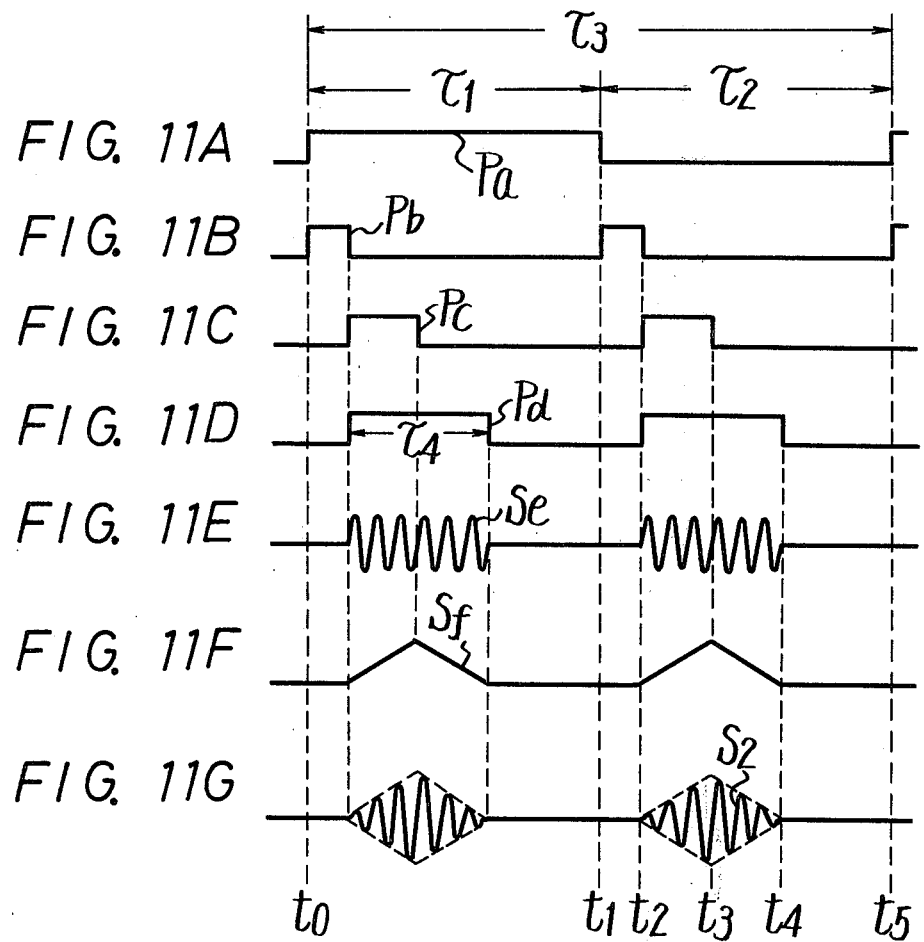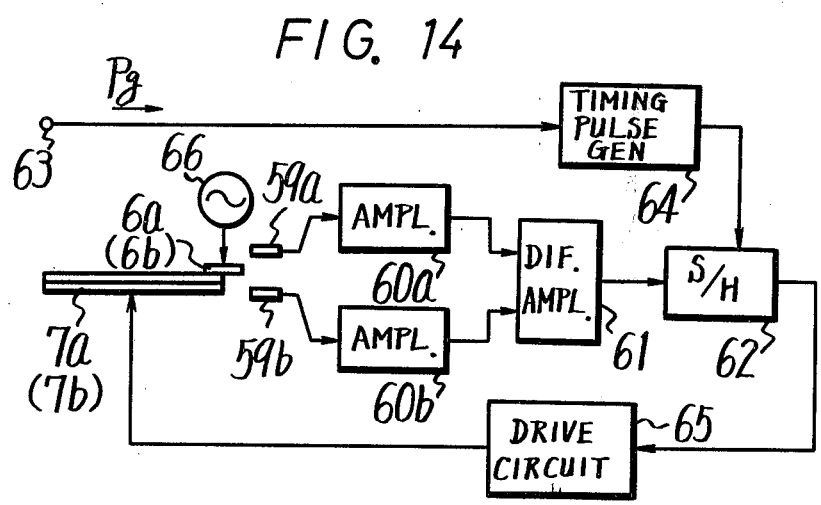

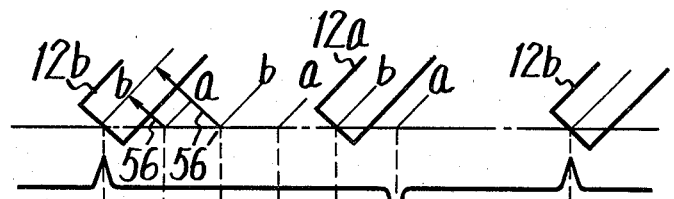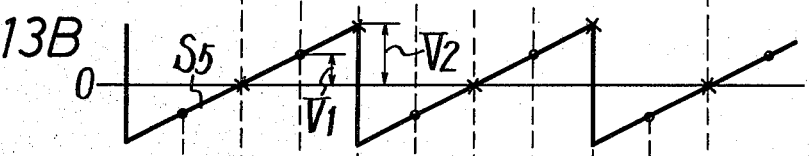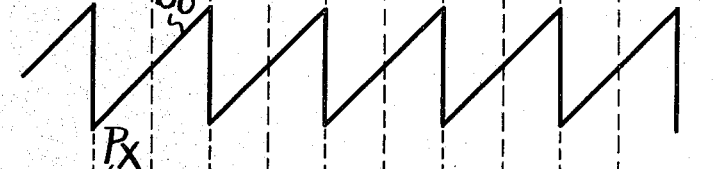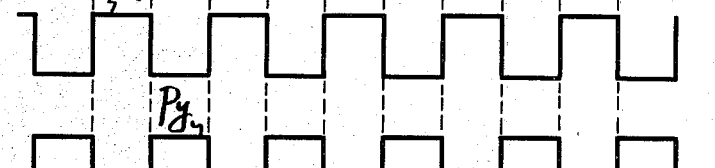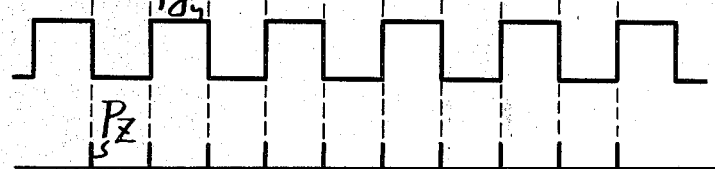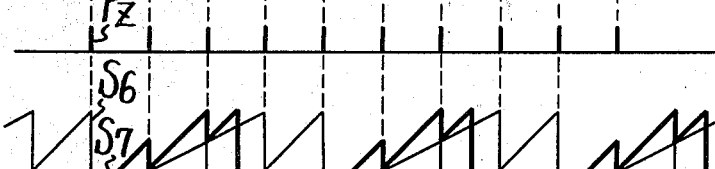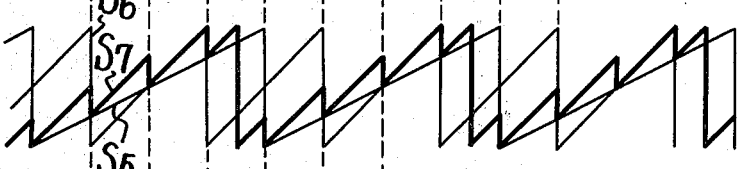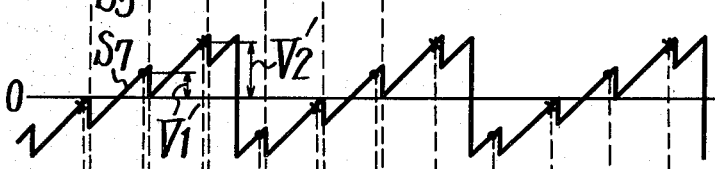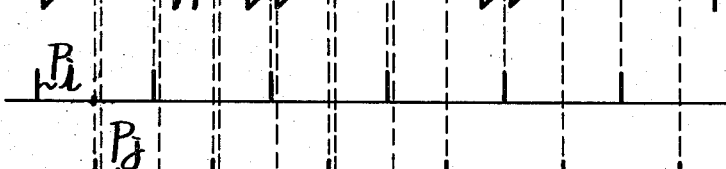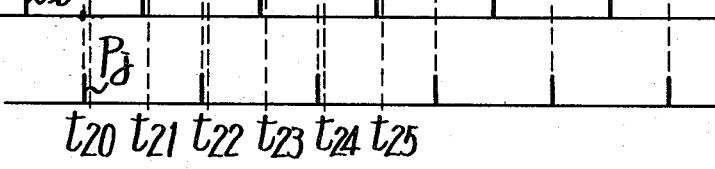

HEAD POSITIONING SIGNAL GENERATING APPARATUS

BACKGROUND OF THIS INVENTION

1. Field of the Invention

This invention relates generally to helical scan type video tape recorders and, more particularly, is directed to an automatic head scanning system employing an electrically deflectable bi-morph leaf on which a rotary magnetic head of a helical scan type video tape recorder is mounted.

2. Description of the Prior Art

There has recently been developed a helical scan type video tape recorder (HVTR) adapted to perform in any one of a plurality of special reproducing modes without the generation of noise. In particular, the video tape recorder includes a pair of rotary magnetic heads on a rotary disk or drum which are spaced apart or separated from each other by 180 degrees. A video tape is wrapped or separated about the periphery of the rotary drum over 180 degrees so that one revolution of the drum results in the rotary magnetic heads scanning two skewed video tracks on the video tape during recording and/or reproducing operations.

In the reproducing mode, these heads must correctly trace or scan the video tracks in order to achieve such noiseless reproducing function. To this end, each magnetic head is installed on the rotary drum by means of a bi-morph leaf or other electro-mechanical transducer (hereinafter generally referred to as a bi-morph leaf). In the reproducing mode, a drive signal is applied to each of the electrodes of each bi-morph leaf to drive or deflect the same so that the respective head correctly and automatically traces the respective video track.

Referring now to FIGS. 1 and 2, an HVTR is shown to include a chassis 1, a rotary magnetic head device 2 comprised of an upper rotary drum 3 and a lower fixed drum 4, and a driving device 5, such as a motor or the like. In this embodiment, lower drum 4 is fixed on chassis 1 and only upper drum 3 is rotated by driving device 5. A pair of transducers (rotary magnetic heads) 6a and 6b are mounted on upper drum 3 through bi-morph leaves 7a and 7b, respectively, with an angle of 180 degrees therebetween. Also, the HVTR includes a tape edge guide 8 provided on lower drum 4 for guiding a magnetic tape 10 wrapped about rotary head device 2 and a magnetic head for providing control track (CTL) pulses. The magnetic tape 10 is wrapped and transported about rotary magnetic head device 2 over an angular range slightly larger than 180 degrees. In FIG. 1, the contacting section of heads 6a and 6b on tape 10 extends about an angle $\theta_1$ slightly larger than 180°, and the non-contacting section thereof extends about an angle $\theta_2$ equal to $360° - \theta_1$. In this example, the magnetic tape 10 is adapted to drive a tape counter roller 11 to generate tachometer pulses.

The video tracks formed on magnetic tape 10 are shown in FIG. 3, in which tracks 12 are formed by magnetic head 6a and tracks 12b are formed by magnetic head 6b, respectively. Each reference character $P_{ct}$ represents a CTL pulse, which is recorded along the lower longitudinal edge of magnetic tape 10 at a rate of one pulse per two video tracks so as to have a frequency of 30 Hz.

With the above described device, when reproducing, positional tracing deviations of video tracks 12a and 12b by magnetic heads 6a and 6b are detected to obtain corresponding drive signals, which are supplied to bi-morph leaves 7a and 7b to change the respective heights of magnetic heads 6a and 6b. Thus, for the normal reproducing mode, in addition to other reproducing modes having different tape running speeds, rotary magnetic heads 6a and 6b accurately trace video tracks 12a and 12b of magnetic tape 10 in a substantially correct manner, so that a reproduced image without guardband noise is obtained.

In such case, each signal supplied to bi-morph leaves 7a and 7b is predetermined from an information signal obtained, for example, in correspondence with the running speed of magnetic tape 10, the CTL pulses, or the like. In addition, when magnetic head 6a (or 6b) is reproducing a signal from track 12a (or 12b), the drive signal fed to bi-morph leaf 7a (or 7b) is controlled to a suitable value by a feedback signal from a closed loop circuit. However, when head 6a (or 6b) arrives at its non-contacting position with respect to tape 10, the drive signal is controlled only by an open loop signal from the aforesaid information signal, so that a trace error is apt to occur at a position where magnetic head 6a (or 6b) starts to trace video track 12a (or 12b).

The above condition will now be described with respect to the reproducing mode of, for example, a still picture image. In the still reproducing mode, tape 10 is stopped and head 6a (or 6b) traces, for example, a locus or path 12 shown by dashed lines in FIG. 3. Accordingly, the above trace results in an angular error $\theta_0$ relative to the track which is desired to be traced, resulting in the generation of reproduced noise. In this case, and considering only head 6a, a sawtooth signal $S_0$, as shown in FIG. 4A, is fed to bi-morph leaf 7a to change the height of head 6a as a function of time. By repeating the above operation at every tape contacting section $\theta_1$, head 6a is caused to accurately trace track 12a or 12b. In FIGS. 4A and 4B, the abscissa represents time, while the ordinate represents the voltage V (FIG. 4A) of the drive signal supplied to bi-morph leaf 7a and the deflection $\delta$ (FIG. 4B) of the top end of bi-morph leaf 7a (that is, the correcting deflection of or height of head 6a). It should be appreciated that the voltage $V_0$ in FIG. 4A corresponds to the deflection $\delta_0$, shown in FIG. 3 by the arrow therein. In FIGS. 4A and 4B, $\tau_1$ and $\tau_2$ each indicate one field period, in which $\tau_1$ corresponds to the reproducing interval of head 6a, $\tau_2$ corresponds to the flyback period of head 6a and also to the reproducing interval of head 6b, and $\tau_3 (=\tau_1+\tau_2)$ represents one rotation period of rotary drum 3. The head 6b performs the same operation but delayed by one field interval from that of head 6a.

Although the above description has been given for the case of still mode operation, a similar result occurs in the case where the tape running speed is different from the normal speed, such as in the slow motion mode, and a sawtooth signal corresponding to the tape running speed is fed to each of bi-morph leaves 7a and 7b to obtain a without substantial noise reproduced therewith picture. For example, in the slow motion mode, the supply of sawtooth signal $S_0$ to the bi-morph leaf permits the head to correctly trace a track. However, in order to prevent mistracking from occurring at the trace starting point on each track by each head, other position measurements are necessary.

A description will now be given of the slow motion mode wherein the tape running speed is ⅓ the normal speed. In FIG. 6A, the tape is shown to have the above-mentioned video tracks 12a and 12b recorded thereon and the CTL pulses $P_{ct}$ recorded along the lower longitudinal edge thereof, as previously discussed. Switching pulses $P_x$ and $P_y$, each being produced as a function of the rotation of rotary drum 3, are shown in FIGS. 6D and 6E. During an interval where pulse $P_x$ is at logic level "1", head 6a is adapted to reproduce a signal from a respective track 12a, and during an interval where pulse $P_y$ is at logic level "1", head 6b is adapted to reproduce a signal from a respective track 12b. Thus, between time points $t_{11}$ and $t_{12}$, head 6a traces track 12a of FIG. 6A, between time points $t_{12}$ and $t_{13}$, head 6b traces a locus or path 55 shown by dashed line, between time points $t_{13}$ and $t_{14}$, head 6a traces a locus or path 57 shown by another respective dashed line, and between time points $t_{14}$ and $t_{15}$, head 6b traces track 12b, respectively. In other words, mistracking occurs between time points $t_{12}$ and $t_{13}$ and $t_{13}$ and $t_{14}$. The above mistracking can be avoided by shifting head 6b, between time points $t_{12}$ and $t_{13}$, in the direction of arrow 56 by an amount necessary for head 6b to trace the same track 12a, and by shifting head 6a, between time points $t_{13}$ and $t_{14}$, in the direction of arrow 58 by an amount necessary for head 6a to trace the later occurring track 12b.

For this reason, we have previously proposed a predictive potential generating circuit, as shown in FIG. 5. In this circuit, CTL pulse $P_{ct}$ from CTL head 9 is amplified by an amplifier 46 and then supplied to an up-down counter 47 at its load terminal L. Meanwhile, tape counter roller 11 of the video tape recorder is provided with a frequency generator (FG) 48, which produces an FG pulse (tachometer pulse) $P_{fg}$. This pulse $P_{fg}$ is amplified by an amplifier 49 and then supplied to counter 47 at its clock input terminal CL. It should be appreciated that the repetitive frequency of pulse $P_{fg}$ from FG 48 corresponds to the tape running speed. Based upon the forward or reverse movements of the tape, an adding or subtracting instruction signal is supplied to an input terminal 50, which is connected to counter 47 at its up-down (U/D) signal input terminal.

The relationship between CTL pulse $P_{ct}$ and video tracks 12a and 12b is shown by FIG. 6A, and the relationship between CTL pulse $P_{ct}$ and FG pulse $P_{fg}$ is shown in FIG. 6B. The FG pulse $P_{fg}$ has a repetitive frequency of 900 Hz in the normal reproducing mode so that 30 pulses appear during one period of CTL pulse $P_{ct}$, that is, within one frame of a video signal. The number of the above FG pulses within one frame is always constant regardless of the tape running speed. Thus, each time that a CTL pulse $P_{ct}$ is applied to counter 47, counter 47 is loaded to "15".

The output of counter 47 is supplied to a D/A (digital-to-analog) converter 51, which produces a stepped signal $S_5$, as shown in FIG. 6C. In this case, the phase of stepped signal $S_5$ is selected so that, in the normal reproducing mode, the trace starting time point for each head 6a or 6b relative to each track 12a or 12b, for example, the time point $t_{11}$ for head 6a, coincides, in time, with the height (level) of stepped signal $S_5$ near its middle portion. The stepped signal $S_5$ is fed to sample-hold circuits 52a and 52b, respectively, and the outputs thereof are supplied through terminals 53a and 53b to the respective bi-morph leaves 7a and 7b. The sample-hold circuits 52a and 52b are also fed with switching pulses $P_x$ and $P_y$ (shown in FIGS. 6D and 6E), respectively through terminals 54a and 54b. As described above, in this example, the tape running speed is selected as ⅓ that of the normal speed. In the interval in which pulse $P_x$ is ON or at logic level "1", head 6a comes into contact with tape 10 and the output of D/A converter 51 is sampled and held by sample-hold circuit 52a. In the interval in which pulse $P_y$ is ON or at logic level "1", head 6b comes into contact with tape 10 and the output of D/A converter 51 is sampled and held by sample-hold circuit 52b. Further, stepped signal $S_5$ is sampled at respective positive-going edges of pulses $P_x$ and $P_y$.

At the time point $t_{11}$ when head 6a starts its trace, stepped signal $S_5$ is sampled by pulse $P_x$ at about the center of the stepped wave (the amplitude of signal $S_5$). If a voltage at this position is taken as a reference voltage (for example, zero voltage) of the predictive potential, bi-morph leaf 7a will be applied with a predictive potential of zero so that bi-morph leaf 7a is not deflected at all at the beginning of the trace. Accordingly, at time point $t_{11}$, head 6a of bi-morph leaf 7a starts its contact with tape 10 from its home position so that head 6a begins to correctly trace track 12a. Thereafter, the above described drive signal $S_0$ is supplied to bi-morph leaf 7a to achieve correct tracing of the track.

Upon completion of the signal reproducing operation by head 6a between time points $t_{11}$ and $t_{12}$, head 6b starts to trace track 12a from time point $t_{12}$. Since stepped signal $S_5$ is sampled by sample-hold circuit 52b at the positive-going edge ($t_{12}$) of pulse $P_y$, the signal $S_5$ derived therefrom, namely, the predictive potential, is fed to bi-morph leaf 7b. Thus, bi-morph leaf 7b is deflected according to the polarity (for example, positive) of the sampled signal $S_5$, that is, in the direction of the arrow 56 (for example, the positive direction) in this case, by an amount corresponding to the level ($V_1$) of signal $S_5$. As a result, head 6b traces track 12a, and thereafter the drive signal $S_0$ is supplied to bi-morph leaf 7b so that head 6b almost correctly traces track 12a.

Between time points $t_{13}$ and $t_{14}$, head 6a will again start its tracing operation. However, at time point $t_{13}$, signal $S_5$ sampled by circuit 52a becomes $-V_2$, as shown in FIG. 6C, and this potential is supplied to bi-morph leaf 7a. Therefore, in this case, bi-morph leaf 7a is deflected in the negative direction (shown by arrow 58) by an amount corresponding to the voltage $V_2$. As a result, head 6a starts to almost correctly trace track 12b.

At time point $t_{14}$, the voltage sampled by the sample-hold circuit 52b becomes zero (reference voltage) and thereafter the same operation is repeatedly carried out. Accordingly, each of heads 6a and 6b is applied with the predictive potential before starting its trace and a substantially correct tracing operation can be carried out at each trace starting time. The voltages thus obtained from sample-hold circuits 52a and 52b in alternately successive modes are shown in FIG. 6F.

Although the predictive potentials can be produced in the above-described manner, as shown in FIG. 6, these predictive potentials are obtained immediately before each of heads 6a and 6b starts its tracing operation. Thus, since the response characteristics of bi-morph leaves 7a and 7b are poor, perfect tracking can not be obtained before starting and at the beginning of the trace.

OBJECTS AND SUMMARY OF THE INVENTION

Accordingly, it is an object of this invention to provide a novel helical scan type video tape recorder having special reproducing functions that avoids the above-described difficulties encountered in the prior art.

It is another object of this invention to provide a novel automatic head tracking system for use with a helical scan type video tape recorder.

It is a further object of this invention to provide an improved automatic head tracking system for use with a helical scan type video tape recorder of the type wherein a rotary magnetic head for reproducing video signals is secured on an electrically deflectable bi-morph leaf.

It is a still another object of this invention to provide an automatic head tracking system including a head positioning circuit which supplies a suitable control potential to a bi-morph leaf on which a rotary magnetic head is mounted.

In accordance with an aspect of the present invention, the head height position at the entrance of each video track formed on a video tape is determined by the tape position.

In particular, a head positioning apparatus for a helical scan tape recorder of the type including a rotary transducer adapted to reproduce signals from recording tracks on a recording medium and mounted on electrically deflectable plate means, includes pulse signal generating means for generating pulse signals representative of the speed of movement of the recording medium; control signal reproducing means for producing control signals representative of the position of the rotary transducer relative to the recording tracks on the recording medium; first counting means for counting up or down the pulse signals from the pulse signal generating means; reference signal generating means for generating a reference signal in association with the rotation of the rotary transducer; second counting means for counting up or down the pulse signals, with the second counting means being preset with an output of the first counting means at the occurrence of the reference signal; and sampling means for sampling an output of the second counting means shortly before the second counting means is preset with the output of the first counting means so as to derive a control potential which is applied to the electrically deflectable plate means so that the rotary transducer accurately scans the beginning of the recording tracks.

In accordance with a further aspect of this invention, the rotary transducer includes first and second magnetic heads adapted to alternately scan the recording tracks on the recording medium, the electrically deflectable plate means includes first bi-morph means supporting the first head and second bi-morph means supporting the second head, and the sampling means includes first sample-hold means for sampling the output of the second counting means at the end of the scan by the first head of one of the recording tracks and supplying the sampled output to the first bi-morph means when the first head begins scanning the next respective recording track and second sample-hold means for sampling the output of the second counting means at the end of the scan by the second head of one of the recording tracks and supplying the sampled output at the end of the scan by the second head to the second bi-morph means when the second head begins scanning the next respective recording track.

The head positioning apparatus according to this invention further includes, in a preferred embodiment, control signal generator means for controlling the first and second bi-morph means in accordance with the speed of movement of the recording medium so that the first and second heads accurately scan the recording tracks; and hysteresis erase signal generator means for removing a hysteresis distortion from the first and second bi-morph means as a result of the scanning of said recording tracks by the first and second heads, in which the sampled outputs from the first and second sample-hold means are supplied to the first and second heads after removal of the hysteresis distortion from the respective bi-morph leaves and before the control by the control signal generator means.

The above, and other objects, features and advantages of the present invention will be apparent from the following detailed description of illustrative embodiments of the invention which is to be read in connection with the accompanying drawings.

BRIEF DESCRIPTION OF THE DRAWINGS

FIG. 5 is a block diagram of a prior art predictive potential generating circuit; FIGS. 6A through 6F are waveform diagrams used for explaining the circuit of FIG. 5;

FIG. 7 is a block diagram of a head positioning apparatus according to one embodiment of this invention;

FIGS. 8A and 8B are waveform diagrams used for explaining the operation of the apparatus of FIG. 7;

FIGS. 11A through 11G are waveform diagrams used for explaining the operation of the generator of FIG. 10;

FIGS. 13A through 13J are waveform diagrams used for explaining the operation of the generator of FIG. 12; and FIG. 14 is a block diagram of one embodiment of a position control potential generator according to this invention which can be used with the apparatus of FIG. 7.

DESCRIPTION OF THE PREFERRED EMBODIMENT

Figure 1:
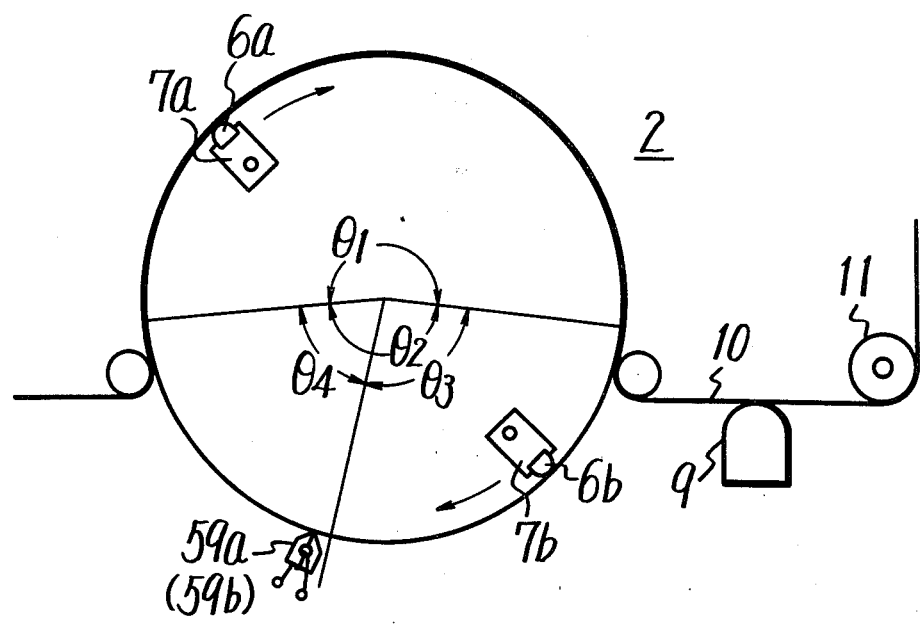
FIG. 1 is a schematic plan view of a rotary drum used in a VTR for explaining the operation of the present invention.
Figure 2:
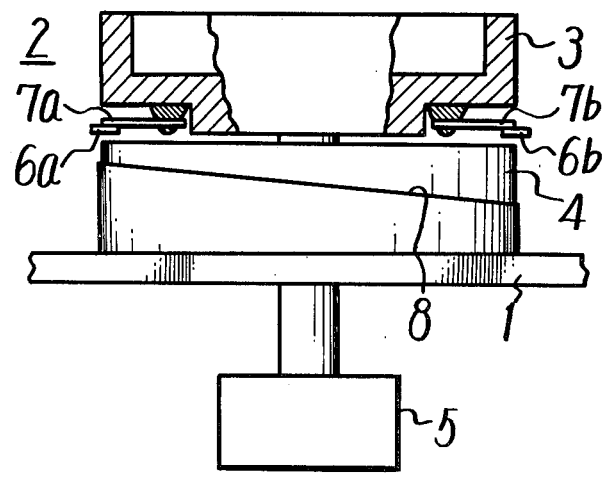
FIG. 2 is an elevatioinal view, partially cut away, of the rotary drum in FIG. 1.

Referring to the drawings in detail, and initially to FIG. 7 thereof, a description will now be given of one embodiment of the apparatus according to this invention. First, circuits for generating various signals to be applied to bi-morph leaf 7a during an interval from the trace start time point $t_0$ of head 6a to the next trace start time point $t_5$ thereof, and the signal waveforms for the above with movement of bi-morph leaf 7a, will be described with reference to FIGS. 7, 8A and 8B.

The circuit of FIG. 7 includes a control signal generator 13 for generating a reproducing control signal $S_1$, a hysteresis erase signal generator 14 for generating a hysteresis erase signal $S_2$ which functions to erase mechanical hysteresis caused by hysteresis of bi-morph leaf 7a (or 7b) a generator 15 for generating a predictive potential $S_3$ according to this invention, and a generator 16 for generating a position control potential $S_4$ of head 6a or 6b, respectively. In the reproducing mode of the video tape recorder, the predictive potential $S_3$ from generator 15 is supplied through a reproducing contact P of a changeover switch 17 to a switch circuit 18, and in the recording mode thereof, the position control potential $S_4$ from generator 16 is supplied through a recording contact R of switch 17 to switch circuit 18. Further, a vertical synchronizing pulse or quasi-vertical synchronizing pulse $P_{VD}$ is fed from an input terminal 19 to a timing signal generator 20 to derive therefrom various timing pulses, which are then supplied to switch circuit 18. Thus, in switch circuit 18, respective signals derived from control signal generator 13, hysteresis erase signal generator 14, and movable contact 17a of switch 17 are supplied to bi-morph leaf 7a at proper time periods and time points. The above also holds true for bi-morph leaf 7b.

The signals $S_1$, $S_2$ and $S_3$ from the respective generators and the time points at which the above signals are supplied bi-morph leaf 7a will now be explained with reference to FIGS. 8A and 8B.

Figure 3:
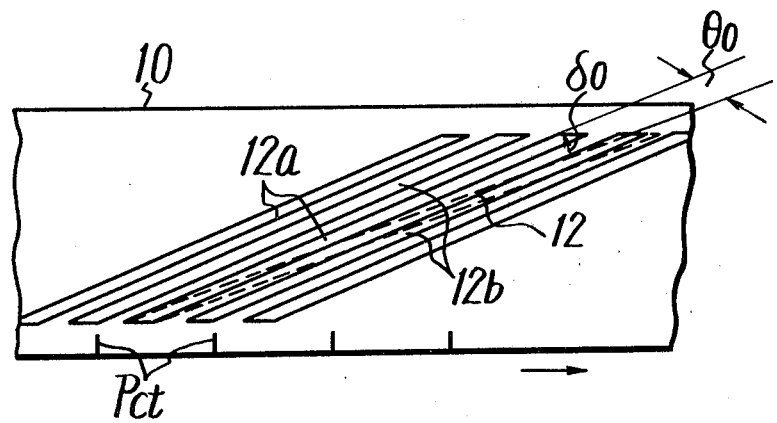
FIG. 3 is a plan view of a magnetic tape showing the relationship between the video tracks and CTL pulses recorded thereon.

It is first assumed that the circuit of FIG. 7 is in the reproducing mode, wherein switch 17 is changed over to the illustrated position. Between time points $t_0$ and $t_1$, reproducing control signal $S_1$ from generator 13 is supplied through switch circuit 18 to bi-morph leaf 7a. When the tape running speed is different from the normal speed, the control signal $S_1$ is formed by adding a wobbling or dithering signal to a correction voltage (the sawtooth voltage determined by the tape running speed, as described in FIG. 4A) for correcting the angle $\theta_0$ described in FIG. 3. As the wobbling or dithering signal, a sine wave signal of 720 Hz, for example, can be used.

At time point $t_1$, the supply of the control signal $S_1$ to bi-morph leaf 7a is cut off, and between time points $t_2$ and $t_4$, namely, during the non-contacting section of head 6a with tape 10 (the flyback interval), the hysteresis erase signal $S_2$ from generator 14 is fed through switch circuit 18 to bi-morph leaf 7a. Further, between time points $t_4$ and $t_5$, the predictive potential (signal $S_3$) from generator 15 is supplied through switch circuit 18 to bi-morph leaf 7a.

In the recording mode, the position control potential (signal $S_4$) from generator 16 is fed through the recording contact R of switch 17 and further through switch circuit 18 to bi-morph leaf 7a. A time point when signal $S_4$ is fed to bi-morph leaf 7a is within the angular range $\theta_4$ shown in FIG. 1, which will be described later.

Figure 9:
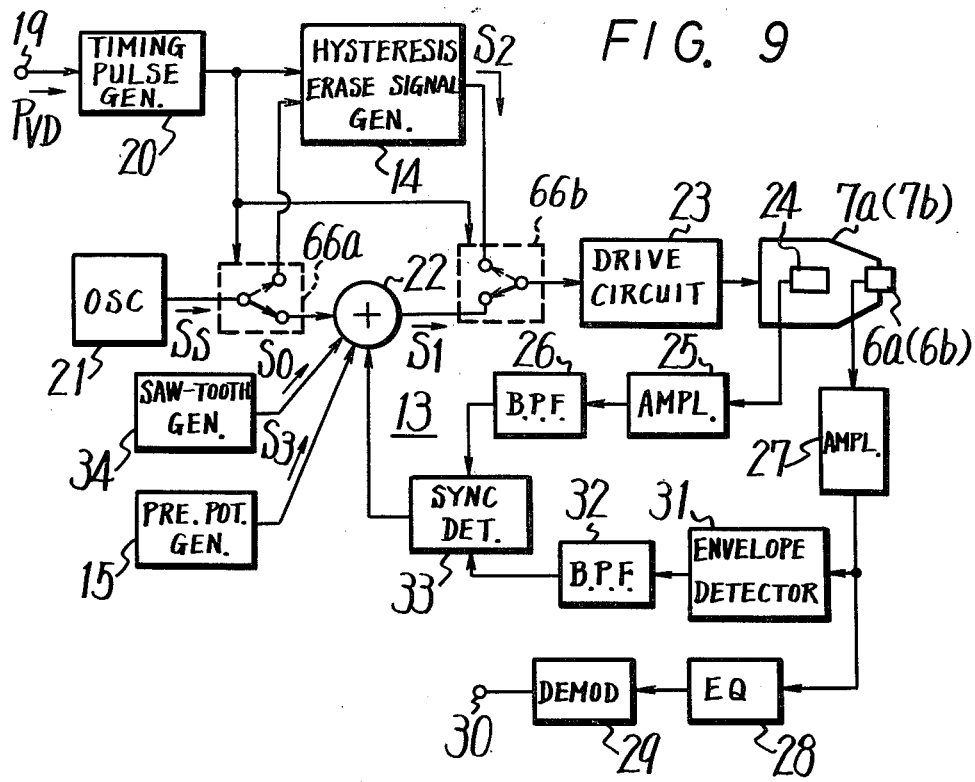
FIG. 9 is a block diagram of one embodiment of a reproducing control signal generator according to this invention which can be used with the apparatus of FIG. 7.

First, reproducing control signal generator 13 for producing the signal $S_1$ will be described. As shown in FIG. 9, an oscillator 21 generates a wobbling or dithering signal $S_s$ having a frequency $f_c$ ($f_c$ is 720 Hz, by way of example). This wobbling signal $S_s$ is supplied through an adder 22 to a drive circuit 23, where it is amplified and supplied to bi-morph leaf 7a. The oscillator 21 is locked by a signal from a reference signal oscillator which will also be described later.

An element for detecting the deflection of bi-morph leaf 7a is attached thereto, and may for example, be a strain gauge 24, the output of which is supplied to an amplifier 25 to produce a reference signal. This reference signal is fed to a band pass filter 26, in which a component of frequency $f_c$ is removed. Further, a video signal reproduced from rotary magnetic head 6a mounted on the top end of bi-morph leaf 7a is amplified by an amplifier 27 and one part of the output thereof is fed through an equalizer 28 to a demodulator 29 to obtain a demodulated signal at an output 30. The output of amplifier 27 is also supplied to a reproduced video signal envelope detector 31 to derive therefrom the envelope signal thereof, which is supplied to a band pass filter 32 to derive therefrom a component of frequency $f_c$. Respective outputs of filters 26 and 32 are fed to a multiplier or synchronous detector 33 where they are synchronously detected. The output of detector 33 is further fed to adder 22 where it is added to the signal $S_s$ from oscillator 21. The adder 22 is also fed with the sawtooth signal $S_0$ from a sawtooth generator 34, as described in FIG. 4A. In generator 34, the sawtooth signal $S_0$ can be formed by detecting the tape running speed or the like, but this is not directly related to the main feature of this invention and hence, a detailed description thereof will be omitted. The signal $S_1$ shown in FIG. 8A is formed by adding the signal $S_0$ and the signal $S_s$ together.

Thus, generator 34 generates the sawtooth signal $S_0$ as a function of the tape running speed, and this signal is added with the wobbling or dithering signal $S_s$ from oscillator 21 and then fed to bi-morph leaf 7a. As a result, magnetic head 6a is driven or deflected in response to variation of the tape running speed or the like so that head 6a traces the video track shown in FIG. 3. Also, the wobbling signal $S_s$ of the closed loop acts to effect a correct trace on the track. In this manner, the reproducing control signal $S_1$ is obtained from the control signal generator 13 between time points $t_0$ and $t_1$, namely, during an interval $\tau_1$, as shown in FIG. 8A. This interval corresponds to the contacting period of head 6a on tape 10. The head 6b also performs the same operation within the interval $\tau_2$.

Figure 4A:
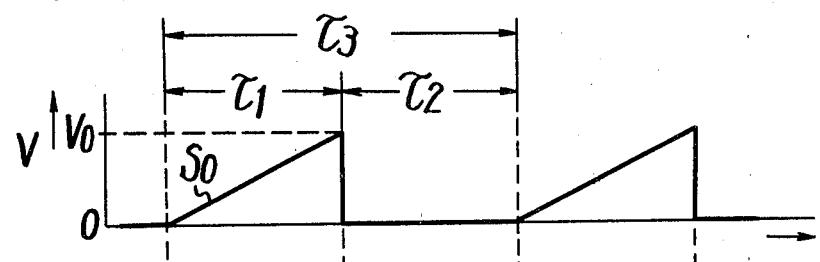
FIGS. 4A and 4B are waveform diagrams used for explaining the operation of a bi-morph leaf.
Figure 4B:
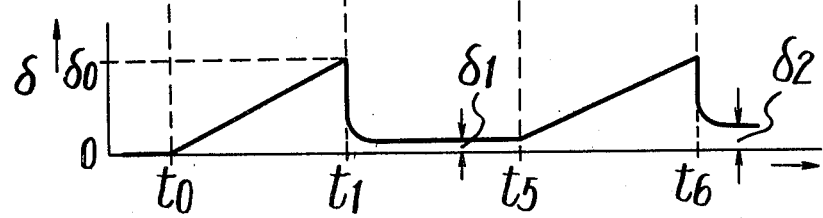

Referring back to FIG. 4, since the bi-morph leaf has a so-called hysteresis characteristic, when the voltage fed to the bi-morph leaf starts to increase from time point $t_0$ and is then reduced to zero at time point $t_1$, as shown in FIG. 4A, head 6a is not returned to its original height, namely, reference height zero, so that a residual distortion $\delta_1$ results, as shown in FIG. 4B. When head 6a is again driven from time point $t_5$ under the above residual distortion condition and then the voltage applied to the bi-morph leaf is again reduced to zero at time point $t_6$, the height of head 6a becomes has a residual distortion $\delta_2$, as shown in FIG. 4B. Thus, the erroneous height of head 6a is gradually increased and may be finally saturated at some value. In any case, the height position of head 6a from the reference height becomes uncertain after the trace is finished, so that thereafter a voltage to be applied to the bi-morph leaf will have a lesser effect. Therefore, in this embodiment, head 6A is returned to the reference height after tracing a track, that is, the residual distortion of bi-morph leaf 7a is removed, and then a predictive potential is applied thereto.

Figure 10:
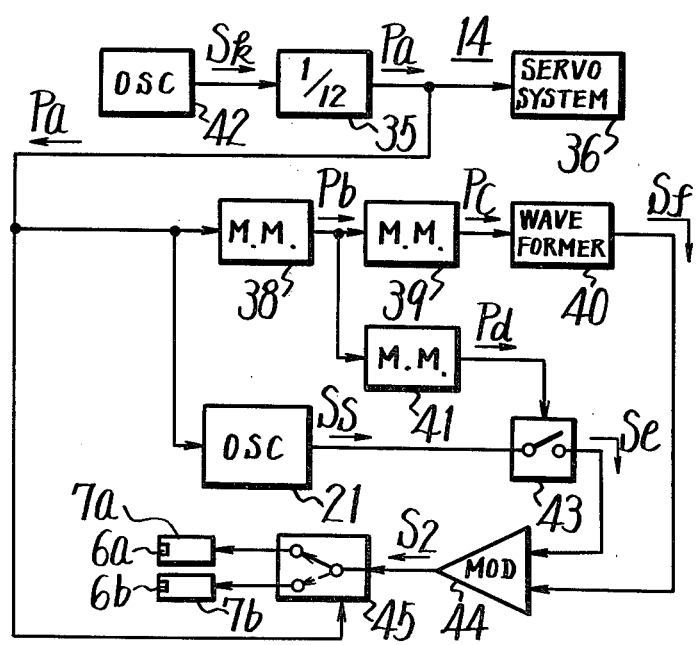
FIG. 10 is a block diagram of one embodiment of a hysteresis erase signal generator according to this invention which can be used with the apparatus of FIG. 7.

The hysteresis erase signal generator 14 will now be described with reference to FIG. 10 and FIGS. 11A to 11G. In FIG. 10, hysteresis erase signal generator 14 is shown to include an oscillator 42 which generates a reference signal having a frequency of $f_c$ (=720 Hz) for driving a video tape recorder, and a frequency divider of 35, for example, a divide-by-12 circuit. The oscillating signal from oscillator 42 is fed to frequency divider 35 to derive therefrom a pulse $P_a$ (refer to FIG. 11A) having a frequency of 60 Hz, which is supplied to a servo system 36 for driving the video tape recorder. Servo system 36 is of a well-known type.

The pulse $P_a$ from frequency divider 35 is also supplied to a first monostable multivibrator 38 to derive therefrom a pulse $P_b$, as shown in FIG. 11B. This pulse $P_b$ is supplied to a second monostable multivibrator 39 to derive therefrom a pulse $P_c$, as shown in FIG. 11C. This pulse $P_c$ is then fed to a triangular wave signal forming circuit 40, which produces a triangular wave signal $S_f$, as shown in FIG. 11F. This triangular wave signal $S_f$ is formed by a capacitor which is charged with pulse $P_c$ and then discharged.

The pulse $P_b$ from first monostable multivibrator 38 is further supplied to a third monostable multivibrator 41 to provide a pulse $P_d$, as shown in FIG. 11D. The output pulse $P_a$ of frequency divider 35 is also fed to the aforesaid oscillator 21, which generates a signal locked to the frequency $f_c$. Accordingly, a signal having a frequency $f_c$ locked in phase to that of the signal $S_k$ from oscillator 42, namely, the signal $S_s$ of 720 Hz, is obtained at the output of oscillator 21. This signal $S_s$ is supplied through an electronic switch circuit 43 to an amplitude modulator 44. The electronic switch circuit 43 is driven by pulse $P_d$ from multivibrator 41. In other words, switch circuit 43 is closed during the ON or logic level "1" interval of pulse $P_d$ and opened during the OFF at logic level "0" interval thereof. Therefore, switch circuit 43 provides at its output a signal $S_e$, as shown in FIG. 11E, and this signal $S_e$ is fed to modulator 44 where it is modulated by the signal $S_f$ to obtain a modulated signal, as shown in FIG. 11G, which is the signal $S_2$ previously described in reference to FIG. 8A. The signal $S_2$ is switched at a change-over switch 45 and supplied to bi-morph leaf 7a or 7b during respective field intervals. In FIG. 11, time points on the abscissa are shown corresponding to those of FIG. 8 for a better understanding of the present invention.

As is apparent from FIG. 8, if the interval $\tau_1$ is taken as the contacting period of head 6a to on the tape and the interval $\tau_2$ as the contacting period of head 6b, an interval between time points $t_1$ and $t_2$, namely, a quiescent period, occurs after head 6a completes its contact with tape 10 in order to wait for the natural return of bi-morph leaf 7a to its original position. Then, from time point $t_2$ at which the distortion $\delta_1$ previously mentioned in regard to FIG. 4B remains, an alternate current signal, that is, the hysteresis erase signal $S_2$, is fed to bi-morph leaf 7a. The amplitude of signal $S_2$ is gradually increased with time from time point $t_2$ and then gradually decreased after time point $t_3$. At time point $t_4$, the amplitude thereof is reduced to zero. Practically, the interval between time points $t_1$ and $t_2$ may be selected as about 2 milliseconds and the interval between time points $t_2$ and $t_4$ may be selected as about 8 milliseconds.

As described above, the amplitude of the signal $S_2$ is selected initially equal to approximately zero and is then gradually increased to reduce any shock to bi-morph leaf so as to prevent the same from being damaged or cracked due to an abrupt application of alternate current signal $S_2$ having a large amplitude to the bi-morph leaf. In addition, after time point $t_3$, the amplitude of signal $S_2$ is gradually decreased, that is, a damping oscillation wave signal is applied to bi-morph leaf 7a. Therefore, when the damping amplitude thereof becomes small, the drive of this bi-morph leaf is stopped and it is returned to its original position, that is, the height of head 6a is lowered to the reference height.

In this case, the signal $S_s$ obtained from oscillator 21 has its phase locked to the signal fed to servo system 36 (and to the signal from servo system 36 as is apparent from FIG. 10. Further, the starting and ending positions of signal $S_e$ at the output of switch circuit 43 is determined by the pulse $P_3$ for every field. In other words, as shown in FIGS. 11D and 11E, proper selection of the rising and falling time points of pulse $P_d$ provides an arrangement where, for example, at the positive-going or rising edge of pulse $P_d$ the signal $S_e$ rises from its zero level, and at the negative-going or falling edge of pulse $P_d$ the signal $S_e$ rises from a negative value and terminates at the zero level. This can be arranged by selecting the time width $\tau_4$ of pulse $P_d$ as $\tau_4 = (n)/(2) \times (1)/(f_c)$. Accordingly, in this case, as shown in FIG. 11G, the amplitude of signal $S_2$ is selected exactly equal to zero at the beginning and end thereof, so that bi-morph leaf 7a is suitably driven.

As described above, during the non-contacting interval of head 6a with tape 10 (during the flyback interval), bi-morph leaf 7a is substantially returned to its initial position without hysteresis distortion and a predictive potential, to be described later, is then supplied to bi-morph leaf 7a until the head 6a comes into contact with tape 10, so that head 6a suitably traces track from its entrance point.

In the above embodiment, the frequency of the hysteresis erase signal $S_2$ is selected as 720 Hz, but it is not limited to this frequency. In any case, the frequency of the signal $S_2$ is preferably selected to be out of the audio frequency range. This is because when rotary magnetic drum 2 rotates at a rotary speed of 30 Hz, the selection of an audio frequency for signal $S_2$ causes an increase in the vibrating sound of bi-morph leaf 7a or 7b, resulting in the generation of noise. In this connection, when the amplitude of the hysteresis erase signal $S_2$ is reduced, the noise is also decreased, but in such case, the residual distoration $\delta$ is not removed. Therefore, it is desirable to select the frequency of the signal $S_2$ to be out of the audio frequency range. In this case, however, if the selected frequency is too low, the frequency of vibration of bi-morph leaves 7a and 7b within the determined hysteresis erasing time (between time points $t_2$ and $t_4$ in FIG. 8) is decreased, so that the desired hysteresis erasing effect is not achieved. Therefore, the frequency of the hysteresis erase signal $S_2$ is preferably selected to exceed the audio frequency range, for example, $\sqrt{2}$ or more times the inherent resonant frequency of the bi-morph leaf, such as about 30 kHz. In the above case, it was also ascertained that the bi-morph leaf is returned to the original position (reference position) without causing an apparent vibration.

In this embodiment, as shown in FIG. 9, the signal from oscillator 21 which is used for the wobbling or dithering signal $S_s$ is also used with generator 14 for generation of the hysteresis erase signal $S_2$. In other words, the output from oscillator 21 is switched by an electronic change-over switch 66a and fed to adder 22 or hysteresis erase signal generator 14, and the outputs of adder 22 and generator 14 are further switched by an electronic change-over switch 66b and supplied to drive circuit 23. These switches 66a and 66b are controlled by a change-over signal from timing signal generator 20. In particular, the change-over operation is carried out in the following manner. As is apparent from the above description in FIG. 8, the bi-morph leaf 7a, switches 66a and 66b switched to the positions shown by the solid lines between time points $t_0$ and $t_1$ and to the positions shown by dashed lines between time points $t_1$ and $t_5$. The bi-morph leaf 7b, a switching operation opposite to the above is carried out. Accordingly, bi-morph leaf 7a is supplied with the signal shown in FIG. 8A.

The predictive potential generator 15 according to this invention will now be described with reference to FIG. 12, in which elements corresponding to those described above with reference to the device of FIG. 5 are identified by the same reference numerals. The CTL signal $P_{ct}$ from CTL head 9 is amplified by amplifier 46 and supplied to load terminal L of up-down counter 47 (hereinafter referred to as the first up-down counter), while the signal (pulse) from FG 48 which is attached to counter roller 11 of the video tape recorder is amplified by amplifier 49 and supplied to clock signal input terminal CL of the first-up-down counter 47. The frequency of pulse from the FG 48 always corresponds to the tape running speed, it should be appreciated that this frequency signal may be obtained otherwise than from FG 48.

For example, the frequency signals from a capstan FG can be used instead.

The switching pulses $P_x$ and $P_y$, as shown in FIGS. 13D and 13E, which are the same pulses previously mentioned in FIGS. 6D and 6E, are respectively fed to input terminals 54a and 54b. These pulses $P_x$ and $P_y$ are produced from the PG pulse obtained in accordance with the rotation of drum 3, each having a frequency of 30 Hz in the case of an NTSC color VTR. The pulse $P_x$ from input terminal 54a is fed to a frequency doubler 67 where it is converted to a pulse $P_z$ having a repetitive frequency of 60 Hz (FIG. 13F), which is supplied to a second up-down counter 68 at its load terminal L. The pulse from FG 48 is also fed to a frequency doubler 69 where its frequency is doubled and it is then fed to the clock terminal CL of second up-down counter 68. For an easier explanation and understanding of the operations of first and second up-down counters 47 and 68, analog converted output signals will be used hereinafter. Thus, when the load command is entered into second up-down counter 68, the output of first up-down counter 47 is stored in second up-down counter 68 as its input data. Second up-down counter 68 is then adapted to count the number of clock pulses (the number of pulses from doubler 69) starting from the above stored counting value.

The output of the second up-down counter 68 is supplied to a D-A (digital-to-analog) converter 70 and the output thereof is supplied respectively to first and second samplehold circuits 71a and 71b. Further, switching pulses $P_x$ and $P_y$ (FIGS. 13D and 13E) are respectively supplied from terminals 54a and 54b to first and second delay circuits 72a and 72b to obtain pulses $P_i$ and $P_j$, as shown in FIGS. 13I and 13J which, in turn, are respectively fed to sample-hold circuits 71a and 71b as the sampling pulses therefor to sample the output from D-A converter 70 at time points corresponding to these pulses and then to hold them. Thus, sampled signals are obtained at output terminals 73a and 73b. The delay times of delay circuits 72a and 72b are respectively a little less than one field (33.3 msec) from the respective time points of signals $P_x$ and $P_y$. For example, shortly before the completion of the reproducing operation of head 6a, sample-hold circuit 71a for bi-morph leaf 7a of head 6a is driven to effect the sampling. Thus, sample-hold circuits 71a and 71b are respectively adapted to hold the sampled data for about one field.

Figure 12:
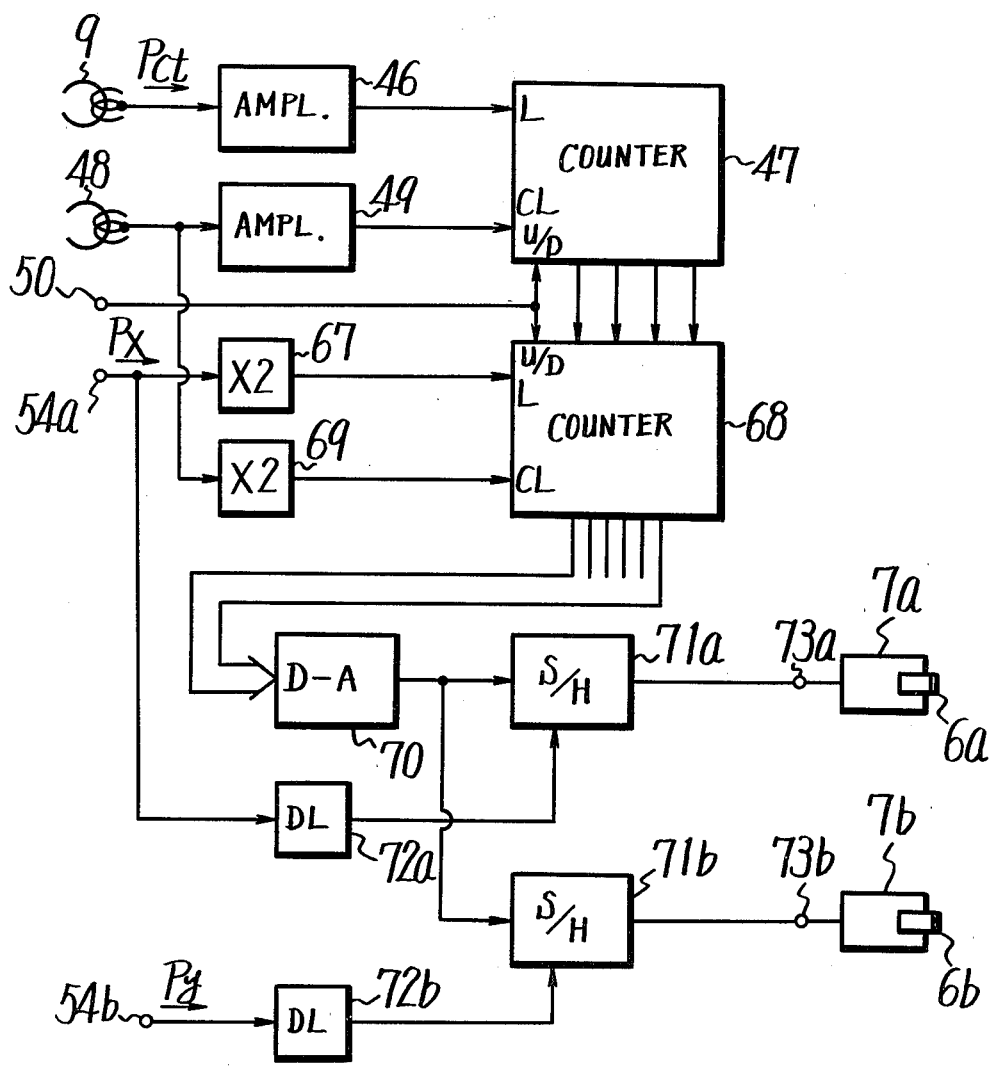
FIG. 12 is a block diagram of one embodiment of a predictive potential generator according to this invention which can be used with the apparatus FIG. 7.

In the circuit shown in FIG. 12, the frequency of the pulse from FG 48 is doubled by frequency doubler 69 and then fed to second up-down counter 68. However, the frequency of the pulse from FG 48 can also be set in advance so as to have a predetermined value which is supplied to clock signal input terminal CL of second up-down counter 68. In such case, frequency doubler 69 is unnecessary, and the pulse from FG 48 is supplied directly or through an amplifier, if necessary, to second up-down counter 68, while the pulse from FG 48 is frequency-divided by $\frac{1}{2}$ and supplied to clock signal input terminal CL of first up-down counter 47, with the same result.

The operation of first up-down counter 47 is exactly the same as described in FIG. 5 is carried out so that the signal $S_5$ (refer to FIG. 6C) is obtained at the output of first up-down counter 47. The signal $S_5$ shown in FIG. 13B corresponds to that of FIG. 6C, but in FIG. 13B the stepped portion is changed to a straight line form, merely as a matter of convenience. Assuming that the output from first up-down counter 47 is equal to zero, then second up-down counter 68 will be reset at every occurrence of switching pulse $P_z$ (FIG. 13F), so that a signal $S_6$, shown in FIG. 13C is obtained therefrom. This signal $S_6$ has an inclination or gradient which is double that of signal $S_5$ because the frequency of the clock signal fed to second up-down counter 68 is double that of the clock signal supplied to first up-down counter 47.

Since second up-down counter 68 is fed with signal $S_5$ from first up-down counter 47, and pulse $P_z$ is also supplied from frequency doubler 67 to load terminal L of second up-down counter 68, signal $S_6$ is equivalently added to the counted value of the output of first up-down counter 47 with the result that a signal $S_7$ having a digital value corresponding to the waveform shown in FIG. 13H is obtained at the output terminal of second up-down counter 68. FIG. 13G illustrates, in a waveform, the above counting process of second up-down counter 68, in which signals corresponding to those of FIGS. 13B and 13C are shown by the same symbols. In this embodiment, the tape running speed is selected as $\frac{1}{4}$ that of the normal speed so that each track is traced twice by each of heads 6a and 6b, that is, four times in all.

When the trace starting point of each of heads 6a and 6b is not corrected by the predictive potential according to this invention, positions of first contact of each head with tape 10 (only relating to the video tracks) are shown by a and b in sequence in FIG. 13A. In particular, at a time point $t_{21}$, head 6b traces track 12b so that it is not necessary to apply a predictive potential to bimorph leaf 7b. However, at a time point $t_{22}$ it is necessary to deflect head 6a in the direction and by an amount shown by an arrow 56, and further at a time point $t_{23}$ it is necessary to deflect head 6b in the direction and by an amount shown by an arrow 56'. As previously described in regard to FIG. 6C, such directions and amounts of deflection can be obtained when the level of signal $S_5$ at its center is taken as zero, as shown in FIG. 13B. Accordingly, in the waveform of signal $S_5$ (FIG. 13B), the position corresponding to head 6a of FIG. 13A is represented by a dot and the position corresponding to head 6b is represented by the mark "X", respectively. For example, at time point $t_{22}$, a positive potential $V_1$ must be fed to bi-morph leaf 7a.

Referring now to FIG. 13H, immediately prior to time point $t_{21}$, signal $S_7$ is sampled by pulse $P_i$ (FIG. 13I) at sample-hold circuit 71a and held for nearly one field period before being applied to bi-morph leaf 7a at time point $t_{22}$. In this case, a sampling voltage $V_1'$ is selected substantially equal to voltage $V_1$ shown in FIG. 13B. Similarly, shortly before time point $t_{22}$, signal $S_7$ is sampled by pulse $P_j$ (FIG. 13J) sample-hold circuit 71b, with a sampling value $V_2'$ substantially equal to the voltage $V_2$, shown in FIG. 13B.

As described above, according to this invention, for head 6a, signal $S_7$ is sampled and held by pulse $P_i$ near the end of its trace, and for head 6b, signal $S_7$ is sampled and held by pulse $P_j$ near the end of its trace, so that the height of each head from its reference position for the next trace can be obtained in advance. Accordingly, these sampled signals are adapted to be supplied to bi-morph leaves 7a and 7b, which are attached with each head, during the flyback intervals of the respective heads, so that each head can be brought back to its proper trace starting position without any difficulty. Thus, the aforementioned difficulties previously mentioned in regard to FIG. 6 can be avoided and height correction for the heads can be provided. In this case, the predictive potential $S_3$ is preferably supplied to the bi-morph leaf after the supply of hysteresis erase signal $S_2$, as previously described in regard to FIG. 8.

As mentioned above, the detected predictive potentials are supplied to bi-morph leaves 7a and 7b well before starting the trace thereby, permitting reliable reproduction of signals from the trace starting time points with no mistracking. In other words, as previously mentioned in FIG. 6 and FIG. 9, the distortions of bi-morph leaves 7a and 7b are removed in advance and the bi-morph leaves are restored to their original positions, so that the predictive potentials can be set in a simple manner. If the above hysteresis erase operation is not carried out, the positions of bi-morph leaves 7a and 7b after tracing can hardly be determined so that setting of the predictive potentials thereafter becomes quite difficult.

The position control potential generator 16 will now be described with reference to FIG. 14. In this embodiment, the generator is primarily used in the recording operation, but can also be used in the reproducing operation, if necessary.

In the reproducing mode, heads 6a and 6b are adapted to trace respective tracks alternately as described above. However, in the video tape recorder having such bi-morph leaves, the heights of heads 6a and 6b in the recording mode, must be set to a respective reference position (corresponding to the zero position in FIG. 13H).

Therefore, in this embodiment, as shown in FIG. 1, height detecting heads 59a and 59b are disposed in a vertical or height direction in the non-contacting section of heads 6a and 6b with tape 10. The outputs of heads 59a and 59b are respectively amplified by amplifiers 60a and 60b, the outputs of which are then fed to a differential amplifier 61 where they are compared with each other. The compared signal is then supplied to a sample-hold circuit 62.

At the same time, the pulse produced in accordance with the rotation of rotary drum 3, namely, pulse $P_g$ (PG) from a pulse generator PG is supplied from a terminal 63 to a timing pulse generator 64 to derive therefrom a timing pulse which is fed to sample-hold circuit 62 so that when head 6a or 6b is arranged in opposing relation to heads 59a and 50b, the compared signal from differential amplifier 61 is sampled and held. A signal corresponding to the compared value at that time is supplied from sample-hold circuit 62 although a drive circuit 65 to bi-morph leaf 7a or 7b. In this case, though the detailed description has been omitted, heads 6a and 6b are fed with AC signals from a signal source 66, which can be detected by detecting heads 59a and 59b.

Thus, when the AC signal is supplied from signal source 66 to heads 6a and 6b with switch 17 (FIG. 7) being changed over to recording contact R and heads 6a and 6b being respectively arranged in opposing relation to detecting heads 59a and 59b in accordance with rotation of rotary drum 3, the difference signal (voltage) is obtained from differential amplifier 61 based upon the difference between the heights of heads 6a and 6b. This difference signal is supplied to bi-morph leaves 7a and 7b so that during the interval in which head 6a or 6b rotates, for example, in the range an angle $\theta_4$, shown in FIG. 1, each head is moved to a position between detecting heads 59a and 59b. Therefore, with this position being set, in advance, as the original or home position, the positions of heads 6a and 6b are adjusted at every rotation thereof during the recording operation. In addition, during each interval of rotation, each head is held at its set or original height position by the output from sample-hold circuit 62. In this case, it is of course possible that the above-mentioned adjustment be carried out, in advance, during an interval of one or several rotations of rotary drum 3 and thereafter, a set voltage from sample-hold circuit 62 obtained by the above adjustment is applied to each of bi-morph leaves 7a and 7b to fix the heights of the same.

In the above description of FIG. 12, the tape is transported in the forward direction, that is, up-down counters 47 and 68 function in an addition mode, respectively. However, it is also possible that the tape is transported in the reverse direction, and up-down counters 47 and 68 respectively function in a subtracting mode, thereby effecting the same operation as described above.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. A head positioning apparatus for a helical scan tape recorder of the type including a rotary transducer adapted to reproduce signals from recording tracks on a recording medium and mounted on electrically deflectable means, comprising:
   pulse signal generating means for generating pulse signals representative of the speed of movement of said recording medium;
   control signal reproducing means for reproducing control signals representing positions of said recording tracks on said recording medium relative to said rotary transducer;
   first counting means for counting one of up and down said pulse signals from said pulse signal generating means;

reference signal generating means for generating a reference signal in association with the rotation of said rotary transducer;

second counting means for counting one of up and down said pulse signals, with said second counting means being preset with an output of said first counting means at the occurrence of said reference signal; and sampling means for sampling an output of said second counting means shortly before the second counting means is preset with the output of said first counting means so as to derive a control potential which is applied to said electrically deflectable means so that said rotary transducer accurately scans the beginning of said recording tracks.

2. A head positioning apparatus according to claim 1, wherein the output from said second counting means has a frequency twice that of the output of said first counting means.

3. A head positioning apparatus according to claim 2, wherein said pulse signals supplied to said second counting means have a frequency which is twice the frequency of the pulse signals supplied to said first counting means.

4. A head positioning apparatus according to claim 2, wherein the counting capacity of said first counting means is determined by the number of said pulse signals generated during one repeating cycle of said control signals.

5. A head positioning apparatus according to claim 1, wherein said first counting means is preset to the center value of a counting cycle with regard to the occurrence of said control signals.

6. A head positioning apparatus according to claim 1; in which said rotary transducer includes first and second heads adapted to alternately scan said recording tracks on said recording medium, said electrically deflectable means includes first bi-morph means supporting said first head and second bi-morph means supporting said second head, and said sampling means includes first sample-hold means for sampling the output of said second counting means at the end of the scan by said first head of one of said recording tracks and supplying said sampled output to said first bi-morph means so that said first head accurately begins scanning a subsequent respective recording track and second sample-hold means for sampling the output of said second counting means at the end of the scan by said second head of one of said recording tracks and supplying said sampled output at the end of the scan by said second head to said second bi-morph means so that said second head accurately begins scanning a subsequent respective track.

7. A head positioning apparatus for a helical scan tape recorder of the type including a rotary transducer adapted to reproduce signals from recording tracks on a recording medium and mounted on electrically deflectable means, comprising:

control signal generator means for controlling said electrically deflectable means in accordance with the speed of movement of said recording medium so that said rotary transducer accurately scans said recording tracks;

hysteresis erase signal generator means for removing a hysteresis distortion from said electrically deflectable means as a result of said scanning of said recording tracks by said rotary transducer; and predictive potential generator means for controlling said electrically deflectable means after removal of said hysteresis distortion so that said rotary transducer accurately scans the beginning of said recording tracks.

8. A head positioning apparatus according to claim 7; in which said hysteresis erase signal generator means includes reference oscillator means for generating a reference oscillation signal; first means for producing a triangular wave signal in response to said reference oscillation signal; second oscillator means for producing a control oscillation signal locked in phase to the reference oscillation signal; modulator means for modulating said control oscillation signal with said triangular wave signal; first switch means for switching said control oscillation signal to said modulator means; switch control means for controlling the operation of said first switch means in response to said reference oscillation signal; and means for supplying said modulated control oscillation signal to said rotary transducer after each scan of one of said recording tracks by said rotary transducer.

9. A head positioning apparatus according to claim 8; in which said hysteresis erase signal generator means further includes first multivibrator means for producing a first pulse signal in response to said reference oscillation signal; said first means includes second multivibrator means for producing a second pulse signal in response to said first pulse signal and wave former means for producing said triangular wave signal in response to said second pulse signal; and said switch control means includes third multivibrator means for producing a third pulse signal in response to said first pulse signal, said third pulse signal being supplied to said switch means.

10. A head positioning apparatus according to claim 7; further including timing pulse generator means for controlling the relative timing of said control signal generator means, said hysteresis erase signal generator means and said predictive potential generator means.

11. A head positioning apparatus according to claim 7; in which said rotary transducer is in close proximity to said recording medium for only a portion of its rotary movement and said predictive potential generator means includes:

pulse signal generating means for generating pulse signals representative of the speed of movement of said recording medium;

control signal reproducing means for reproducing control signals representing positions of said recording tracks on said recording medium relative to said rotary transducer;

first counting means for counting one of up and down said pulse signals from said pulse signal generating means;

reference signal generating means for generating a reference signal in association with the rotation of said rotary transducer;

second counting means for counting one of up and down said pulse signals, with said second counting means being preset with an output of said first counting means at the occurrence of said reference signal; and sampling means for sampling an output of said second counting means shortly before the second counting means is preset with the output of said first counting means so as to derive a control potential which is applied to said electrically deflectable means so that said rotary transducer accurately scans the beginning of said recording tracks.

12. A head positioning apparatus according to claim 11; in which said rotary transducer includes first and second heads adapted to alternately scan said recording tracks on said recording medium, said electrically deflectable means includes first bi-morph means supporting said first head and second bi-morph means supporting said second head, and said sampling means includes first sample-hold means for sampling the output of said second counting means at the end of the scan by said first head of one of said recording tracks and supplying said sampled output to said first bi-morph means so that said first head accurately begins scanning a subsequent respective recording track and second sample-hold means for sampling the output of said second counting means at the end of the scan by said second head of one of said recording tracks and supplying said sampled output at the end of the scan by said second head to said second bi-morph means so that said second head accurately begins scanning a subsequent respective track.

* * * * *